(12) United States Patent
Carr et al.

(10) Patent No.: US 12,687,482 B2
(45) Date of Patent: Jul. 21, 2026

(54) FLOWCELL DEVICE, FLOWCELL CONTROL SYSTEM AND METHOD

(71) Applicant: ABB Schweiz AG, Baden (CH)

(72) Inventors: Benjamin Carr, Stroud (GB); Jonathan Penn, Didcot (GB); Edis Loveless, Bristol (GB); Jack Coughlan, Gloucester (GB)

(73) Assignee: ABB Schweiz AG, Baden (CH)

( * ) Notice: Subject to any disclaimer, the term of this patent is extended or adjusted under 35 U.S.C. 154(b) by 242 days.

(21) Appl. No.: 18/413,420

(22) Filed: Jan. 16, 2024

(65) Prior Publication Data

US 2024/0241033 A1      Jul. 18, 2024

(30) Foreign Application Priority Data

Jan. 16, 2023    (EP) .................................... 23151826

(51) Int. Cl.
G01N 15/1434        (2024.01)
G01N 27/10          (2006.01)

(52) U.S. Cl.
CPC ......... G01N 15/1436 (2013.01); G01N 27/10 (2013.01)

(58) Field of Classification Search
CPC ............... G01N 15/1436; G01N 27/10; G01N 33/1893; G01N 27/333; G01N 27/416
See application file for complete search history.

(56) References Cited

U.S. PATENT DOCUMENTS

| | | | |
|---|---|---|---|
| 5,235,526 A | 8/1993 | Saffell | |
| 7,985,377 B2 | 7/2011 | Vincent | |
| 8,479,598 B2 | 7/2013 | Vincent | |
| 10,265,667 B2 * | 4/2019 | Shor ..................... | B01F 33/453 |
| 2003/0177851 A1 | 9/2003 | Henry et al. | |
| 2008/0013400 A1 * | 1/2008 | Andrews ............... | B01F 33/452 |
| | | | 366/147 |
| 2009/0301175 A1 | 12/2009 | Battefeld et al. | |

FOREIGN PATENT DOCUMENTS

| | | |
|---|---|---|
| CN | 213780065 U | 7/2021 |
| CN | 214310290 U | 9/2021 |
| DE | 102020122826 A1 | 3/2022 |
| GB | 1531000 A | 11/1978 |

OTHER PUBLICATIONS

Machine translation of CN213780065U. (Year: 2021).*
European Patent Office, Extended European Search Report in European Patent Application No. 23151826.7, 10 pp. (Jun. 12, 2023).

* cited by examiner

*Primary Examiner* — Seung C Sohn
(74) *Attorney, Agent, or Firm* — Fitch Even Tabin & Flannery LLP

(57) ABSTRACT

A flow-cell device for sensing electrochemical process parameters includes a cell housing, a sensor housing for receiving a sensor arranged at a side of the cell housing and protruding into the cell housing; and a motor arrangement arranged at the cell housing for stirring the liquid when the flow-cell device is in operation.

11 Claims, 4 Drawing Sheets

200

202
Flow Control Unit

208
Sensor

112
Motor

204
Motor Controller

206
Sensor Circuit

300

302 — Flow rate of liquid controlled

304 — Send flow rate valve to motor controller

306 — Receive flow rate valve

308 — Control motor

FLOWCELL DEVICE, FLOWCELL CONTROL SYSTEM AND METHOD

CROSS-REFERENCE TO RELATED APPLICATIONS

The instant application claims priority to European Patent Application No. 23/151,826.7, filed Jan. 16, 2023, which is incorporated herein in its entirety by reference.

FIELD OF THE DISCLOSURE

The present disclosure relates to a flow-cell device for sensing electrochemical process parameters, a flow-cell control system, a method for sensing electrochemical process parameters in a flow-cell device, and a usage of a motor in a flow-cell device.

BACKGROUND OF THE INVENTION

In flow-cells with, for example, a sensor for measuring chlorine ion concentrations, the sensor consumes chlorine ions. In normal operations with a sufficient high flow rate, the consumption of chlorine ions is offset by the constant replacement of ions due to the flowrate. However, if the flow drops too low, then the ions will not get replaced quickly enough. This will form a layer near the membrane surface with a lower concentration of chlorine, and the reading will drop towards zero.

BRIEF SUMMARY OF THE INVENTION

There may be a desire to provide an improved flow-cell. The described embodiments pertain to the flow-cell device, the flow-cell control system, the method for sensing electrochemical process parameters in a flow-cell device, and the usage of a stirrer in a flow-cell device. Synergetic effects may arise from different combinations of the embodiments although they might not be described in detail.

The embodiments described herein concern a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a flow-cell device for sensing electrochemical process parameters is provided. The flow-cell comprises a cell housing, a sensor housing for receiving a sensor, arranged at a side, e.g., an end side, of the cell housing and protruding into the cell housing; and a motor arrangement arranged at the cell housing for stirring the liquid when the flow-cell is in operation.

The electrochemical process parameters can include, for example, a concentration of molecules or ions such as chlorine ions. The sensor housing may be a housing integrated into the flow-cell device where the sensor may be inserted later. Alternatively, the housing contains the sensor already when assembling the flow-cell device. The sensor may comprise a sensor circuit that may receive sensed sensor signals and convert them into an analog signal or digital data to be communicated to, for example, a server or generally into a network, or which may be communicated to a motor controller that controls the motor, as described in embodiments below.

Since the liquid is stirred by the motor arrangement, a layer with ions consumed by the sensor is disrupted, preventing the formation of a lower concentration of ions, which keeps the measurement correct.

BRIEF DESCRIPTION OF THE SEVERAL VIEWS OF THE DRAWING(S)

DETAILED DESCRIPTION OF THE INVENTION

Corresponding parts are provided with the same reference symbols in all figures.

Figure 1:
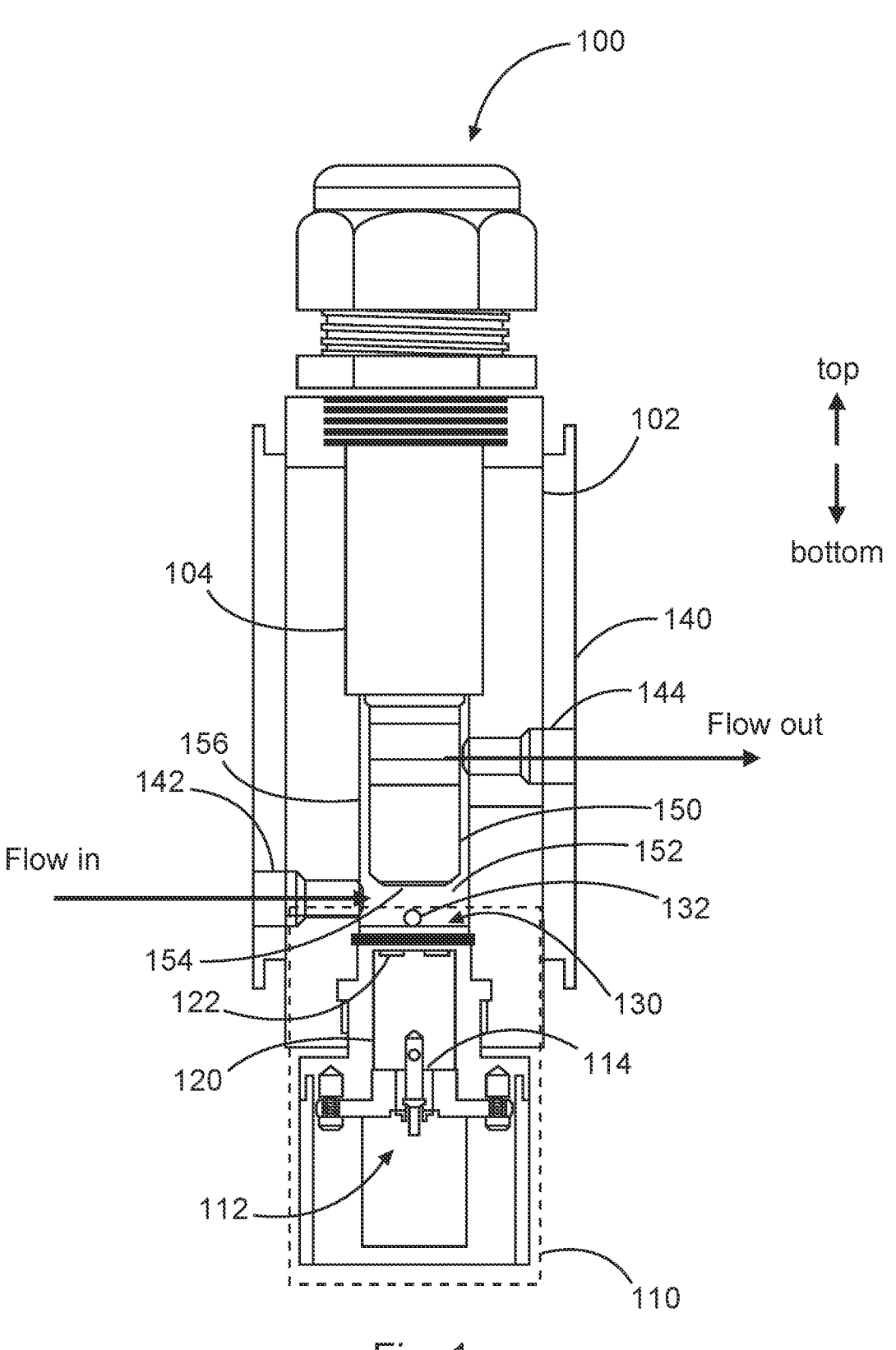
FIG. 1 is a sketch of a flow-cell device shown in cross section, in accordance with the disclosure.

FIG. 1 shows a sketch of a flow-cell device 100 for sensing electrochemical process parameters. The flow-cell device 100 comprises a cell housing 102, a sensor housing 104 for receiving a sensor 150, arranged at a top side of the cell housing 102 and protruding into the cell housing 102. The liquid flow enters the flow-cell device 100 on the bottom left through the inlet or spigot 142. It then passes across the membrane 154 of the sensor 150, and flows through the gap between the sensor 150 and the wall of the pipe 156 to the outlet 144 of the flow-cell device 100, where the liquid or "sample" flows out of the flow-cell device 100.

The flow-cell device 100 comprises further a motor arrangement 110 located at a bottom side of the cell housing 102 with a motor 112, a first portion 120 and a second portion 130. The motor 112 drives a shaft 114 of the motor 112 at its center that is fixed to the first portion 120, such that the first portion 120 rotates when shaft 114 rotates. That is, the motor 112 is configured to drive the shaft 114, and hence the first portion 120. Magnets 122 are fixed decentral at the top of the first portion 120 such that they can rotate together with the first portion 120. The first portion 120 may consist of a housing which encloses a free space and the magnets 122. Alternatively, it may be filled with a light-weight rigid material such as plastic or a porous material supporting the adhesion of the magnets 122 on the top side of the first portion's housing. The first portion 120 is therefore inside the housing of the motor arrangement 110 and has no contact with the liquid of the flow-cell device 100.

Outside this motor housing, at its top surface, the second portion 130 is arranged. The second portion 130 comprises a stirrer bar 132 that is arranged centrally at the top surface of the motor housing. The stirrer bar 132 consists at least partly of magnetic material or is itself a magnet such that it interacts with the magnets 122. That is, when the magnets 122 rotate, the stirrer bar 132 rotates, too. The stirrer bar 132 may be fixed to the housing of the motor 112 using a pin at its rotation axis or may be fixed solely by the magnetic forces if the magnets 122 are permanent magnets.

The volume of liquid 152 in the flow-cell may be minimized in order to make the speed of response of the sensor as fast as possible. This is achieved by minimizing the free volume 152, i.e., the volume where the fluid can flow, between the membrane 154 and bottom of the pipe 156, and hence the distance between the membrane 154 and second portion of the motor arrangement, where the stirrer bar is located. "Minimizing" means as small as possible but large enough space for ensuring a free flow without flow resistance. For example, the free space or volume 152 is in the order of size of the inlet 142 or outlet 144. For example, the distance between the membrane and the stirrer bar is in the same order of size as the diameter of the inlet. In this way, a movement of the stirrer bar 132 has nearly an immediate impact on the concentration of ions or molecules at the membrane 154. As shown in the example of FIG. 1, the minimization of the free volume 152 is realized by having the sensor 150 protrude far enough into the pipe 156 to leave only a gap between the membrane 154 and the bottom of the pipe, which abuts the housing of the motor arrangement and on which the stirrer bar 132 is located. As can be seen from FIG. 1, also the diameter of the pipe 156 is small such that there is only a small gap between the sensor 150 and the wall of the pipe 156. As a result, the fluid moved by the stirrer bar toward the wall of the pipe 156 is reflected by the wall and in this way assists in providing ions at the depleted fluid layer near the membrane 154.

The flow-cell device 100 comprises further a fastening arrangement 140, which provides for modular assembling a device with further modules such as the shown flow-cell device 100. The modules can be attached to each other, for example, with a bracket that is slid over two fastening arrangements 140 of two modules.

The terms "top" and "bottom" relate to an orientation as shown in FIG. 1. The shown orientation of the flow-cell device and its components is only an example and does not necessarily correspond to the orientation of gravity. Further, the locations of the components may be exchanged in terms of top/bottom. Similarly, the flow may be in the reverse direction.

Figures 2, 3:
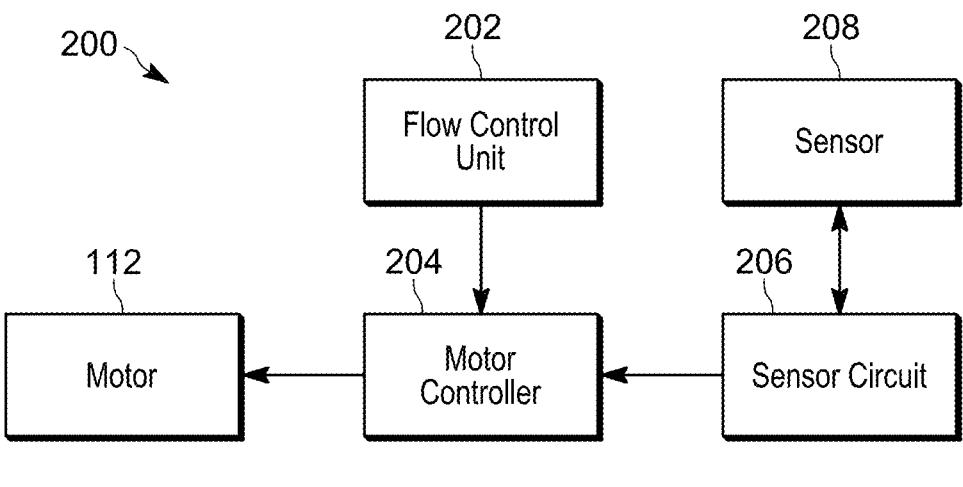
FIG. 2 is a block diagram of a flow-cell control system in accordance with the disclosure.
FIG. 3 is a flow diagram of a method for sensing electrochemical process parameters in a flow-cell device in accordance with the disclosure.

FIG. 2 shows a block diagram of a flow-cell control system 200 for a flow-cell device 100 as described herein. The flow-cell control system 200 comprises a flow control unit 202, a motor controller 204 and a motor 112. The flow-cell control system 200 in FIG. 2 further comprises a sensor circuit 206 that sends sensor data captured by the sensor 208 corresponding to sensor 150s in FIG. 1 to the motor controller 204. The motor controller 204 receives flow rate values from the flow control unit 202 and controls the motor 112 for stirring the liquid inside the cell housing 102. The motor controller 204 may switch on and switch off the motor 112 according to the received flow rate value. For example, the motor controller 204 compares the flow rate value with threshold and switches on the motor 112 when a threshold is exceeded, and switches off the motor 112 when the flow rate value is below the threshold. Alternatively, or in combination, the controlling may include controlling the speed of rotation of the shaft 114 of the motor 112.

FIG. 3 shows a flow diagram of a method 300 for sensing electrochemical process parameters in a flow-cell device 100 as described herein, comprising the following steps. In a first step 302, the flow rate of a liquid in the flow-cell device 100 is controlled by a flow control unit 202, and a flow rate value of the flow rate is sent in a next step 304 to the motor controller 204. In step 306 the flow rate value is received by the motor controller 204. In step 308, the motor is controlled for stirring the liquid in dependence on the flow rate value. The step of controlling 308 the motor for stirring the liquid in dependence on the flow rate may comprise comparing the flow rate value with a pre-defined threshold and switching on the motor 112 if the threshold is exceeded, and switching off the motor 112 if the threshold falls below the threshold.

Figure 4A:
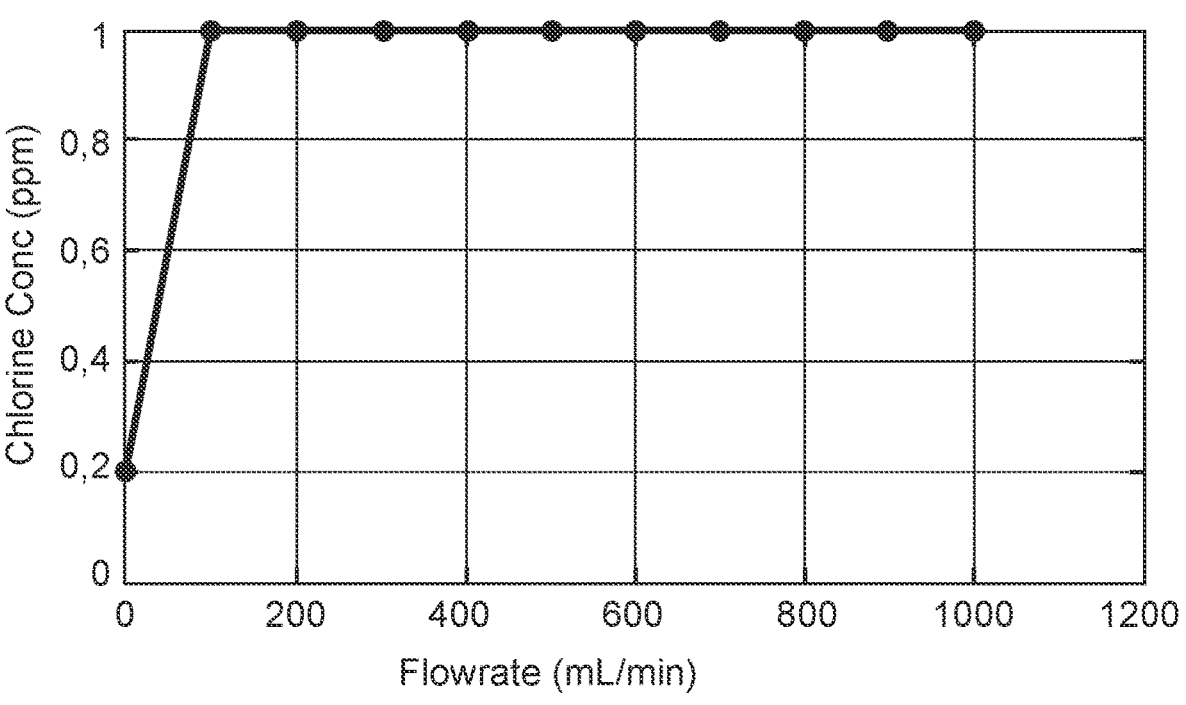
FIG. 4a is a graph illustrating how readings change without the stirrer, in accordance with the disclosure.
Figure 4B:
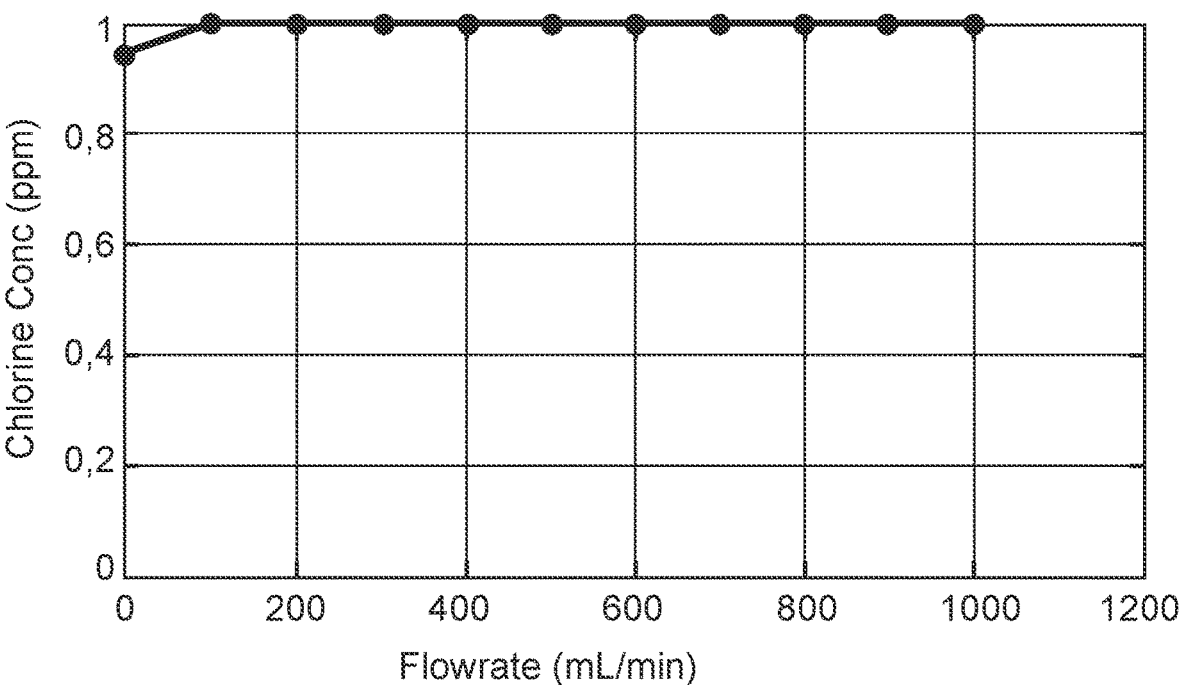
FIG. 4b is a graph illustrating how readings change with a stirrer, in accordance with the disclosure.

FIG. 4*a* shows a graph illustrating how the reading changes without the stirrer. At low flow rates, the reading drops significantly. FIG. 4*b* shows a graph illustrating how the reading changes with the stirrer. Only a small drop can be seen, close to zero, as there is still consumption of chlorine. However, since only a small drop occurs, the sensor can operate at much lower flowrates, and also provides a more stable reading if the flowrate is fluctuating.

Figure 5A:
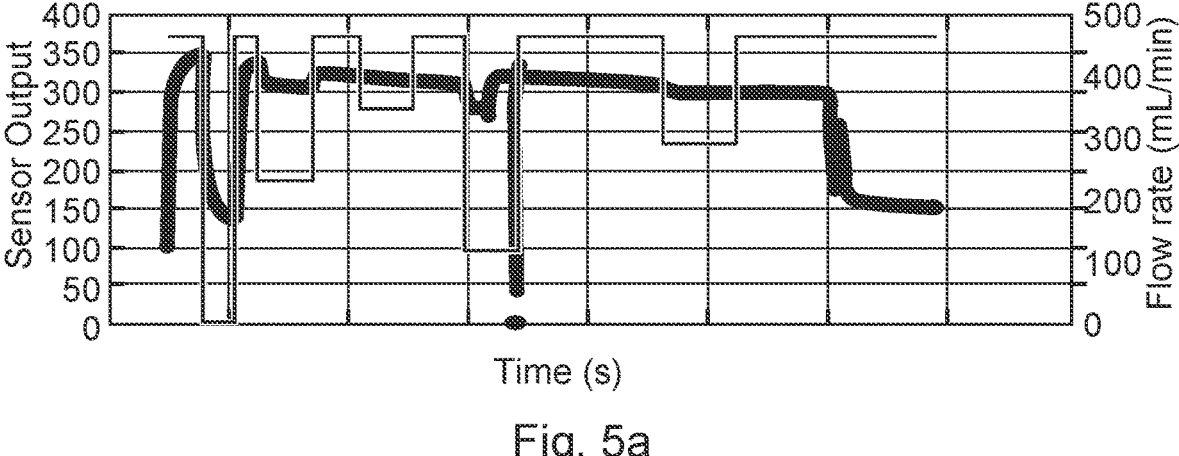
FIG. 5a is a graph showing example flow rates and the respective sensor output without stirrer, in accordance with the disclosure.
Figure 5B:
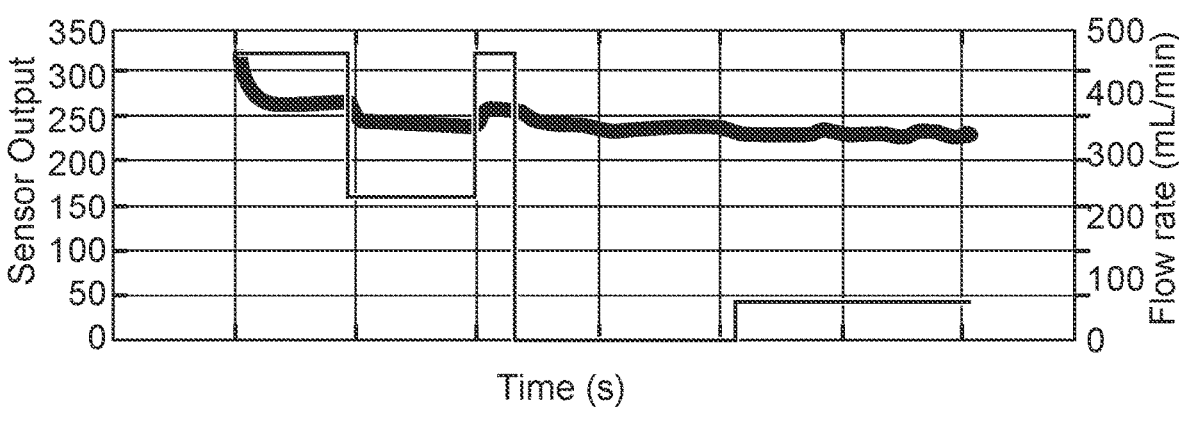
FIG. 5b is a graph showing example flow rates and the respective sensor output while a stirrer is used, in accordance with the disclosure.

FIG. 5*a* depicts a graph showing example flow rates and the respective sensor output without stirrer. FIG. 5*b* depicts a graph with example flow rates and the respective sensor output with stirrer. The responses in the case without stirrer are very sensitive to the flow rate. At a flow rate of 0 mL/min, the reading drops immediately and rapidly. Drops can be recognized at flow rates less than 200 mL/min. In the case with stirrer, in contrast, there are only slight differences in the readings between 0 mL/min and 400 mL/min. In the range between 0 mL/min and 50 mL/min, the sensor output is stable.

The results can even be improved by using a greater stirrer bar size or by the speed of rotation of the stirrer.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

According to an embodiment, the motor arrangement comprises a first portion inside a motor housing such that the first portion does not contact a liquid, a second portion outside the motor housing, and a motor. The motor is configured to drive the first portion of the motor arrangement, the first portion is configured to drive the second portion of the motor arrangement, and the second portion is configured to stir the liquid when the flow-cell device is in operation.

In other words, the motor arrangement comprises a motor for driving a first portion of the motor arrangement, the first portion being not in contact with the liquid for driving a second portion of the motor arrangement, and the second portion being in contact with the liquid for stirring the liquid when the flow-cell is in operation.

The motor arrangement is also referred to as stirrer in this disclosure. The two portions of the motor arrangement effect that the stirring takes place such that the motor does not get in contact with the liquid. The first and the second portions are in physical interaction with each other, such that the second portion, which is responsible for stirring the liquid, rotates with the first portion, which is driven directly by the motor.

According to an embodiment, the first portion of the motor arrangement comprises magnets, and the second portion of the motor arrangement comprises a magnetically effective stirrer bar, wherein the motor is configured to rotate the magnets and the magnets are configured to rotate the magnetic stirrer bar.

The motor is for example a brushless DC motor in order to ensure a required lifetime. "Magnetically effective" means that the stirrer bar is made of magnetic material experiencing magnetic forces or being itself a permanent magnet. In embodiments, the second portion consists only of the stirrer bar. Alternatively, the second portion consists additionally of a fixing mechanism such as a pin around which the stirrer bar rotates or a rotatable disk on which the stirrer bar is mounted.

The geometrical shape of the stirrer bar may be cuboid, but may in principal have any shape that is suitable to stir the liquid and being rotated in the magnetic field of the magnets. For example, instead of a bar-shape, the shape may be rotor-wing-like.

According to an embodiment, the first and the second portions of the motor arrangement are water-tightly separated from each other.

The first and the second portions are water-tightly separated from each other, so that there is no leak path into the motor. The first portion is enclosed in a housing that protrudes at the bottom of the flow-cell housing into the flow-cell and which is coupled in a water-tight way to the housing of the second portion. The housing of the first portion may be made of one integral piece at least in the area, where it protrudes into the flow-cell. Alternatively, it may comprise a lid or a cover, which can be fastened at the top of the housing in a water-tight way. For example, the cover may comprise a thread and/or a seal.

According to an embodiment, the flow-cell device further comprises the sensor, and the sensor again comprises a membrane. The sensor is configured to sense a chemical substance inside the cell housing, more exactly inside a pipe within the cell housing, at the membrane thereby consuming a part of the chemical substance, and the second portion of the motor arrangement is configured to stir a solution comprising the chemical substance.

The membrane is, for example, a diffusion membrane based on electrochemical measurements, which is designed to be conductive as a measuring electrode. The functionality of the sensor thus may comprise consuming the chemical substance, for example molecules or ions such as chlorine ions, at the membrane as the reaction takes place. Conventionally, if the flow drops too low, then the ions will not get replaced quickly enough. This will form a layer near the membrane surface of the sensor with a lower concentration of chlorine, and the reading will drop towards zero. If the stirrer is turned on, then this will agitate the sample, i.e., the liquid, around the membrane surface, and stop this layer of lower concentration from forming. This means that the sensor can operate at a significantly lower flowrate.

The device therefore ensures a significantly improved measurement quality or prevents incorrect measurements at changing or low flow rates. In these cases a concentration gradient near the membrane is avoided and the concentration is detected correctly.

According to an embodiment, the flow-cell device further comprises a pipe configured to receive a fluid from an inlet of the flow-cell device and to direct the liquid to an outlet of the flow-cell device. The membrane is disposed on a side of the sensor facing the motor arrangement. The sensor protrudes sufficiently from the sensor housing into the pipe toward the motor arrangement to leave only a gap between the stirrer bar and the membrane.

A "gap" means that the distance and hence the space or volume between the stirrer bar and the membrane is small. For example, the distance is in the same order of size as the diameter of the inlet. By minimizing this volume, the speed of response of the sensor is increased significantly. The gap may be realized for example by dimensioning the size, i.e., length of the sensor, or the size or length of the sensor housing, by the location of the motor arrangement, in particular the stirrer bar, which may be for example near the inlet, or by dimensioning the size of the flow-cell device itself.

According to an embodiment, the flow-cell device further comprises a transmitter, and the sensor and the motor are powered from the transmitter.

In other words, a signal from a transmitter switches on the sensor and the motor at the same time. The motor may then remain in a switched-on state until a signal from a transmitter indicates switching off the sensor and the motor. The signal may therefore be a switching signal, however, the signal may also provide the power for powering the sensor and/or the motor. As known by a skilled person, a transmitter is an electrical device that can be designed such that it has an output, e.g. the output signal in embodiments described herein, that can be used to provide power to devices such as the sensor or motor, i.e., to drive these devices.

In some of the following measures are presented to improve efficiency and to extend the motor lifetime.

According to an embodiment, the flow-cell device further comprises a flow control unit configured to determine a flow rate of the liquid running through the housing of the flow-cell device, and the flow-cell device further comprises a motor controller configured to control the motor according to the determined flow rate of the liquid.

In other words, the flow rate is controlled by the flow control unit. That is, the flow control unit having information about the flow rate of the liquid, communicates the flow rate to the controller that controls the motor, which is also referred to as motor controller in the following. The motor controller then switches the motor on and off in dependence on the flow rate. As an example, the controller switches on the motor if the flow rate falls below a pre-determined threshold. The same threshold or a different threshold may be used for switching off the motor if the flow rate exceeds this threshold. In alternative embodiments, the motor controller may control the motor in dependence on the rate of change of the concentration. For example, the control unit is configured to provide a control signal for controlling the motor in dependence on the determined flow rate of the liquid.

For example, the motor may be switched on as soon as the concentration drops. In this case, pre-determined thresholds and observation time intervals in which the drop of concentration is to be detected may be applied.

In contrast to switching the motor on or off, in this embodiment, the rotation speed may be adapted to the flow rate of the liquid through the flow-cell. The described options may be mixed. For example, conditions may be determined and different thresholds may be applied at which the motor is stopped or switched on and at which the rotation speed is adapted. Conditions may for example be a concentration or the rate of change of the concentration as described above.

According to an embodiment, the motor controller activates the motor in time intervals.

The time intervals may be regular, pre-determined time intervals or may be dependent on the flow rate or change rate of the concentration or other criteria.

According to an embodiment, the motor and the first portion are a modular unit attachable to the housing of the flow-cell device.

Due to the separation of the first portion and the second portion, the first portion and the second portion may be designed in a modular way, such that, for example, the motor can be easily exchanged, upgraded, etc. For example, the motor controller can be exchanged to have a microprocessor, the software may be updated, or there may be modules with different types of motors, etc.

According to an aspect, a usage of a stirrer in a flow-cell device for stirring a liquid inside the housing of the flow-cell device is provided.

The stirrer consists of a motor arrangement as described herein. The motor drives a stirrer bar and is arranged at the housing of the flow-cell. The transmission of the rotation of the motor and the stirrer bar is realized using magnetic forces.

According to an aspect, a flow-cell control system for a flow-cell device is provided. The flow-cell control system comprises a motor, a motor controller and a flow control unit. The flow control unit is configured to control a flow rate of a liquid in the flow-cell and to send a flow rate value of the flow rate to a motor controller. The motor controller is configured to receive the flow rate value and to control a motor for stirring the liquid, and the motor configured to be controlled by the motor controller.

The flow-cell control system comprises the electrical components of the flow-cell device, especially control means with respect to the stirring such as the flow control unit and the motor controller, and the motor to be controlled. The flow-cell control system may further comprise communication means, for example, for communicating the flow rate and control signals.

According to an embodiment, the flow-cell control system further comprises a sensor circuit configured to detect an electrochemical process parameter sensed by a sensor of the flow-cell device, wherein the sensor circuit is configured to send an electrochemical process parameter value to the motor controller, and wherein the motor controller is configured to control the motor using the electrochemical process parameter value.

The sensor circuit may be part of the sensor or a separate processing unit. The sensor circuit is the electronic part of that converts the sensing into analog signals and/or digital output signals and which represents the interface to further data or signal processing devices, such as network devices, clients or servers, or it may be itself a human machine interface.

According to an aspect, a method for sensing electrochemical process parameters in a flow-cell device is provided, comprising the following steps. In a first step, a flow rate of a liquid in the flow-cell device is controlled by a flow control unit. In a second step a flow rate value of the flow rate is sent to a motor controller by the flow control unit. In a third step, the flow rate value is received by a motor controller and in a fourth step, the motor is controlled for stirring the liquid in dependence on the flow rate value by the motor controller.

According to an embodiment, the step controlling the motor for stirring the liquid in dependence on the flow rate comprises comparing the flow rate value with a pre-defined threshold and switching on the motor if the threshold is exceeded, and switching off the motor if the threshold falls below the threshold.

There may be two different thresholds for switching off such that a hysteresis is obtained. Further, instead of switching, the rotation speed may be controlled.

The communication between the control unit and the motor controller for providing the flow rate may be realized by a wired connection, over which an analog or digital signal is transmitted to the motor controller. Alternatively, the communication takes place over a wireless connection to any known communication standard, especially a short range communication standard. The control of the motor is realized in any suitable way known to a skilled person. E.g. the control is performed using analog and/or digital circuits and by providing a control current or control voltage to the motor. The digital circuits may include logic elements or logic devices, programmable devices such as a CPLD, an FPGA, a microprocessor, etc. Further the motor controller may include memory devices to accommodate software or data, and/or to log the control actions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE NUMERALS

100 Flow-cell device
102 Cell housing
104 Sensor housing
110 Motor arrangement
112 Motor
114 Shaft
120 First portion of motor arrangement
122 Magnets
130 Second portion of motor arrangement
132 Stirrer bar
140 Fastening arrangement
142 Spigot/Inlet
144 Outlet
150 Sensor
152 Free volume/space between membrane and bottom of pipe
154 Membrane of sensor
156 Pipe
200 Flow-cell control system
202 Flow control unit
204 Motor Controller
206 Sensor circuit
208 Sensor
300 Method
302 First method step
304 Second method step
306 Third method step
308 Fourth method step

What is claimed is:

1. A flow-cell device for sensing electrochemical process parameters, comprising:
   a cell housing comprising a pipe adapted to receive liquid;
   a sensor housing configured for receiving an electrochemical sensor for sensing an ion concentration of liquid in the pipe, the sensor being disposed at a side of the cell housing and protruding into the cell housing; and
   a motor arrangement disposed on the cell housing and configured for stirring liquid present within the cell housing in the pipe when the flow-cell device is in operation wherein the motor arrangement comprises:
   a motor housing;
   a first portion disposed inside the motor housing such that the first portion does not contact the liquid,
   a second portion disposed outside the motor housing and protruding into the cell housing, and
   a motor configured to drive the first portion of the motor arrangement;
   wherein the first portion is configured to drive the second portion of the motor arrangement;
   wherein the second portion is configured to stir the liquid in the pipe;
   an inlet and an outlet, wherein the pipe is configured to receive the liquid from the inlet of the flow-cell device and to direct the liquid to the outlet of the flow-cell device;
   the electrochemical sensor including a membrane disposed on a side of the electrochemical sensor facing the motor arrangement;
   wherein the electrochemical sensor is configured to sense the ion concentration of a chemical substance solved in the liquid inside the pipe within the cell housing by the membrane to consume a part of the chemical substance, and the second portion of the motor arrangement is configured to stir the liquid in the pipe comprising the chemical substance;
   wherein the sensor protrudes sufficiently from the sensor housing into the pipe toward the motor arrangement to leave only a gap between a magnetically effective stirrer bar and the membrane.

2. The flow-cell device according to claim 1, wherein the first portion of the motor arrangement comprises magnets, and the second portion of the motor arrangement comprises the magnetically effective stirrer bar, and wherein the motor is configured to rotate the magnets, and the magnets are configured to rotate the magnetic stirrer bar.

3. The flow-cell device according to claim 1, wherein the first and the second portions of the motor arrangement are water-tightly separated from each other.

4. The flow-cell device according to claim 1, wherein the flow-cell device further comprises a transmitter, and wherein the sensor and the motor are powered from the transmitter.

5. The flow-cell device according to claim 1, further comprising:
   a flow control unit configured to determine a flow rate of the liquid running through the cell housing of the flow-cell device; and
   a motor controller configured to control the motor according to a determined flow rate of the liquid.

6. The flow-cell device according to claim 5, wherein the motor controller activates the motor in time intervals.

7. The flow-cell device according to claim 1, wherein the motor and the first portion are a modular unit attachable to the cell housing of the flow-cell device.

8. A flow-cell control system for a flow-cell device, the flow-cell device comprising:
   a cell housing;
   a sensor housing configured for receiving a sensor, the sensor being disposed at a side of the cell housing and protruding into the cell housing;
   a motor arrangement disposed on the cell housing and configured for stirring liquid present within the cell housing when the flow-cell device is in operation;
   a flow control unit configured to control a flow rate of a liquid in the flow-cell device and to send a flow rate value of the flow rate to a motor controller, wherein the flow rate comprises a continuous range of values including and between a minimum value and a maximum value;
   wherein the motor controller is configured to receive the flow rate value and to control the motor arrangement for stirring the liquid, the motor arrangement including a motor configured to be controlled by the motor controller.

9. The flow-cell control system according to claim 8, further comprising a sensor circuit configured to detect an electrochemical process parameter sensed by a sensor of the flow-cell device; wherein the sensor circuit is configured to send an electrochemical process parameter value to the motor controller; and wherein the motor controller is configured to control the motor using the electrochemical process parameter value.

10. A method for sensing electrochemical process parameters in a flow-cell device, comprising:
   controlling by a flow control unit a flow rate of a liquid in the flow-cell device, wherein the flow rate comprises a continuous range of values including and between a minimum value and a maximum value;

sending a flow rate value of the flow rate to a motor controller;

receiving by the motor controller the flow rate value; and controlling a motor using the motor controller, the motor operating to stir the liquid in dependence on the flow rate value.

11. The method according to claim 10, wherein the controlling the motor for stirring the liquid in dependence on the flow rate comprises comparing the flow rate value with a pre-defined threshold, switching on the motor when the threshold is exceeded; and switching off the motor when the flow rate falls below the threshold.

\* \* \* \* \*